United States Patent
Hu (10) Patent No.: US 8,953,735 B2
(45) Date of Patent: Feb. 10, 2015

(54) STEAM GENERATOR DUAL SYSTEM SLUDGE AND LOOSE PARTS COLLECTOR

(75) Inventor: Min-Hsiung Hu, Murrysville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 2292 days.

(21) Appl. No.: 12/035,722

(22) Filed: Feb. 22, 2008

(65) Prior Publication Data

US 2009/0092216 A1 Apr. 9, 2009

Related U.S. Application Data

(60) Provisional application No. 60/977,406, filed on Oct. 4, 2007.

(51) Int. Cl.
*G21D 1/02* (2006.01)
*G21D 1/00* (2006.01)
*F22B 37/48* (2006.01)

(52) U.S. Cl.
CPC .............. *G21D 1/006* (2013.01); *F22B 37/483* (2013.01); *Y02E 30/40* (2013.01)
USPC ........................................ 376/347

(58) Field of Classification Search
USPC ................ 376/347; 165/159; 60/644.1, 203.1
See application file for complete search history.

(56) References Cited

U.S. PATENT DOCUMENTS

| | | | |
|---|---|---|---|
| 3,716,451 A * | 2/1973 | Van Sickel et al. ........... 376/461 |
| 3,916,844 A | 11/1975 | Cassell |
| 4,055,048 A | 10/1977 | Reed |
| 4,079,701 A | 3/1978 | Hickman et al. |
| 4,205,963 A | 6/1980 | Marion et al. |
| 4,303,043 A | 12/1981 | Redding |
| 4,579,088 A | 4/1986 | Kim, Jr. et al. |
| 4,632,068 A | 12/1986 | Appleman et al. |
| 4,836,274 A | 6/1989 | Firth et al. |
| 5,396,948 A | 3/1995 | Poussin |

* cited by examiner

*Primary Examiner* — Jack W Keith
*Assistant Examiner* — Sean P Burke
(74) *Attorney, Agent, or Firm* — Richard J. Coldren; Westinghouse Electric Company LLC (57) ABSTRACT

A U-tube steam generator having a dual system for collecting loose parts and sludge. A loose parts collector having a water overflow edge is disposed between a feedwater inlet and a tube bundle of the steam generator. A sludge collector having a water outlet that is disposed downstream of the overflow edge of the loose parts collector and maintains a pressure differential between a water inlet of the sludge collector and the water outlet.

16 Claims, 5 Drawing Sheets

STEAM GENERATOR DUAL SYSTEM SLUDGE AND LOOSE PARTS COLLECTOR

CROSS-REFERENCE TO RELATED APPLICATIONS

This application is related to application Ser. No. 11/563,742 filed Nov. 28, 2006. This application is a Continuation of Provisional Application No. 60/977,406, filed Oct. 4, 2007 from which this application claims priority.

BACKGROUND OF THE INVENTION

1. Field of the Invention

This invention relates in general to steam generators for nuclear power plants and more particularly, to vertical, U-tube steam generators having both loose parts and sludge collectors.

2. Description of Related Art

A nuclear steam generator comprises a vertically oriented shell, a plurality of U-shaped tubes disposed in the shell so as to form a tube bundle, a tube sheet for supporting the tubes at the ends opposite the U-like curvature, a dividing plate that cooperates with the tube sheet and a channel head forming a primary fluid inlet header at one end of the tube bundle and a primary fluid outlet header at the other end of the tube bundle. A primary fluid inlet nozzle is in fluid communication with the primary fluid inlet header and a primary fluid outlet nozzle is in fluid communication with the primary fluid outlet header. The steam generator secondary side comprises a wrapper disposed between the tube bundle and the shell to form an annular chamber made up of the shell on the outside and a wrapper on the inside, and a feedwater ring disposed above the U-like curvature end of the tube bundle.

The primary fluid having been heated by circulation through the reactor enters the steam generator through the primary fluid inlet nozzle. From the primary fluid inlet nozzle the primary fluid is conducted through the primary fluid inlet header, through the U-tube bundle, out the primary fluid outlet header, through the primary fluid outlet nozzle to the remainder of the reactor coolant system. At the same time, feedwater is introduced to the steam generator secondary side through a feedwater nozzle which is connected to a feedwater ring inside the steam generator. Upon entering the steam generator, the feedwater mixes with water returning from steam separators, called the recirculation stream. This mixture, called the downcomer flow is conducted down the annular chamber adjacent to the shell until the tube sheet near the bottom of the annular chamber causes the water to reverse direction passing in heat transfer relationship with the outside of the U-tubes and up through the inside of the wrapper. While the water is circulating in heat transfer relationship with the tube bundle, heat is transferred from the primary fluid in the tubes to the water surrounding the tubes causing a portion of the water surrounding the tubes to be converted to steam. The steam then rises and is conducted through a number of moisture separators that separate entrained water from the steam, and the steam vapor then exits the steam generator and is typically circulated through electrical generating equipment to generate electricity in a manner well known in the art.

Since the primary fluid contains radioactive materials and is isolated from the feedwater only by the U-tube walls, the U-tube walls form part of the primary boundary for isolating these radioactive materials. It is, therefore, important that the U-tubes be maintained defect-free so that no breaks will occur in the U-tubes that will cause radioactive materials from the primary fluid to enter the secondary side; an undesirable result.

Loose parts enter the steam generator through the feedwater stream and can cause damage to the heat transfer tubes. Sludge can also enter the steam generator through the feedwater stream and can also cause damage to the heat transfer tubes. The size of sludge particles are in the range of micrometers while loose parts are in the range of inches. Sludge tends to deposit on tube surfaces and eventually lead to chemical concentrations that cause tubing corrosion. The damage caused by loose parts and sludge can result in having to plug or repair the damaged tubes to avoid contamination of the secondary fluid. In extreme cases, the damage can lead to a tube leak and forced outage with significant expense to the plant. Therefore, it is important to prevent foreign objects and minimize sludge from entering the steam generator and/or to remove the loose parts and sludge from the steam generator before tube damage occurs.

Prior attempts to prevent steam generator loose parts from reaching the tube bundle have focused on a sieving action. For example, spray nozzles with small holes have been attached to the feedwater distribution ring to trap loose parts. Although such spray nozzles have succeeded in trapping larger parts, small parts may pass through the holes in the nozzles due to their size. Such loose parts, e.g., pieces of metal rope or rods, have caused tube damage in operating steam generators.

Co-pending application Ser. No. 11/563,742 filed on Nov. 28, 2006 (NSD 2005-013) proposes an improved loose parts collector that employs a weir having a vertical wall that surrounds at least a portion of a lower deck plate of the steam generator. The weir has a radially inwardly extending lip affixed to the upper end of the wall that traps loose parts as the combined feedwater and recirculation stream flows over the weir and down the downcomer between the wrapper and the shell. This proposed arrangement provides a substantial improvement to the collection of loose parts.

Previously, sludge collectors had been used which generally provided collector boxes that sat on top of the lower deck plate. The collector boxes typically had centrally disposed water inlet holes and peripherally disposed water outlet holes around the circumference of the collector box lid. The sludge collector box would draw a portion of the feedwater from the feedwater ring and the recirculation stream into the collector box through the water inlet holes on the lid. The water passes through the collector towards the periphery of the box in extremely slow motion providing the particles time to settle to the floor of the collector box while the water continues exiting the collector box through the outlet holes at the edge of the lid of the collector box. The water enters the collector due to a pressure differential between the inlet and outlet holes on the lid of the collector box. The pressure differential is due to the fact that the fluid flow near the inlet holes is relatively quiescent compared to the flow over the outlet holes where the remaining portion of the feedwater from the feedwater ring and the recirculation stream is rushing into the downcomer annulus at a relatively high velocity. Therefore, fluid static pressure is relatively high at the inlet holes and low at the outlet holes and a pressure differential is developed between them that is the driving force to draw the water into the box of the sludge collector.

The loose parts collector proposed by application Ser. No. 11/563,742, filed Nov. 28, 2006 (NSD 2005-013) consisting of the weir having a circular vertical skirt around the edge of the lower deck together with a horizontally inwardly extending lip complicates and to a degree compromises the operation of the sludge collector. The water pool on top of the lower deck plate receives both recirculated water and feedwater. The recirculated water comes from the separated water from the primary separator. The separated water is at the saturation temperature. The feedwater discharges into the water pool via spread tubes or J-tubes of the feedwater ring. The feedwater is subcooled, about 100° F. below the saturation temperature. The separated, saturated water will mix with the subcooled feedwater in the water pool. The mixed water is still subcooled (about 20° F. below the temperature of the saturated water) and flows over the edge of the lower deck plate and downward along the downcomer annulus.

The water mass in the water pool over the lower deck plate is large compared to the mass of the feedwater flow and the recirculated, saturated water flow. Thus, the fluid flow in the water pool and on the lower deck plate is generally slow except for the limited local zones where water enters and leaves the pool. Therefore, loose parts will not travel far prior to falling on lower deck plate. The weir will therefore retain the fallen loose parts. However, the weir also restricts flow at the outlet of the sludge collector and, thus, pressure is essentially uniform on top of the lower deck. In other words, both the center and edge are at the same high pressure. Thus, because of the weir of the loose part collector, the pressure differential between the inlet and the outlet holes of the sludge collector disappears and thus there would be no flow within the sludge collector box when combined with such a loose parts collector. In other words, the installation of the loose parts collector described in co-pending application Ser. No. 11/563,742 (NSD 2005-013) has the potential to destroy the function of the sludge collector.

Accordingly, it is an object of this invention to provide an improved loose parts collector and sludge collector that will not impede the performance of either.

Furthermore, it is an object of this invention to provide such a dual sludge and loose parts collector that will efficiently collect both loose parts and sludge.

Additionally, it is an object of this invention to provide such a loose parts and sludge collector that will not impede the efficiency of the steam generator.

SUMMARY OF THE INVENTION

This invention achieves the foregoing objectives by providing a dual system that will collect sludge as well as loose parts that enter a steam generator with each function sharing the pool of water that is supported on the lower deck plate of the steam generator. This steam generator includes a feedwater inlet and a tube bundle spaced from the feedwater inlet. The loose parts collector is disposed between the feed water inlet and the tube bundle with the loose parts collector having a water overflow edge which partially retains the pool of water on the lower deck plate fed from the feedwater inlet. The sludge collector shares, in part, the pool of water and has a water outlet disposed downstream of the overflow edge of the loose parts collector.

In one preferred embodiment the loose parts collector includes a vertical wall that extends in an upward direction from the lower deck plate of the steam generator and surrounds the feedwater pool fed by the feedwater inlet. The sludge collector water outlet is disposed downstream of an interior side of the vertical wall. Desirably the loose parts collector is positioned on top of the sludge collector.

In another embodiment, the sludge collector comprises a vertical wall which extends upward from a lower deck plate of the steam generator and surrounds a pool of water fed by the feedwater ring. The sludge collector also comprises a cover that is supported spaced above the lower deck plate with the cover having a number of access openings disposed inwardly of the vertical wall. The access openings form an inlet for the feedwater to enter the sludge collector. The peripheral edge of the cover is desirably radially spaced from the vertical wall at least a number of circumferential locations. The cover as a vertically extending ledge that surrounds at least a portion of the cover and terminates in an upward direction to form the overflow edge. At least portions of the vertically extending ledge are spaced from an interior side of the vertical wall to form a conduit therebetween that forms the water outlet of the sludge collector. Preferably, the overflow edge has a radially, inwardly extending lip that forms a weir for the collection of loose parts. In one preferred embodiment the vertical wall and the vertically extending ledge define an annular passage that forms the sludge collector water outlet. In still another embodiment the vertical wall and the vertically extending ledge are formed as one member with the sludge collector water outlet extending therethrough. In the latter embodiment the sludge collector water outlet may be formed by a series of tubes extending through the one member and circumferentially spaced around the periphery of the lower deck plate.

In still another embodiment the invention includes a nuclear reactor power generation facility having a steam generator that includes the afore described dual system for the collection of loose parts and sludge.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
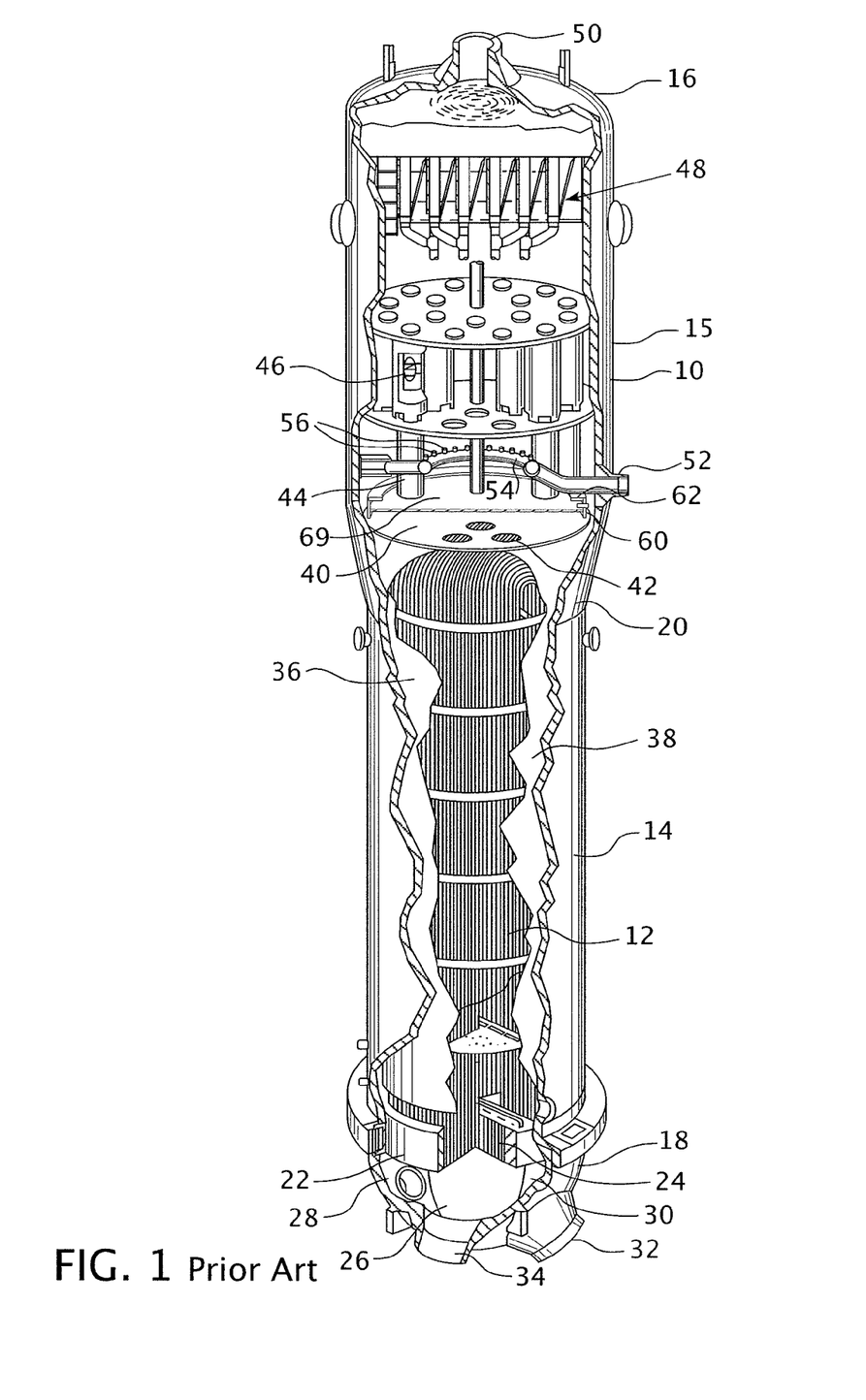
FIG. 1 is a perspective view, partially cut away, of a vertical steam generator.

Referring now to the drawings, FIG. 1 shows a steam or vapor generator 10 that utilizes a plurality of U-shaped tubes which form a tube bundle 12 to provide the heating surface required to transfer heat from a primary fluid to vaporize or boil a secondary fluid. The steam generator 10 comprises a vessel having a vertically oriented tubular lower shell portion 14 and a top enclosure or dished head 16 enclosing the upper end and a generally hemispherical shaped channel head 18 enclosing the lower end. The lower shell portion 14 is smaller in diameter than the upper shell portion 15 and a frustoconical-shaped transition 20 connects the upper and lower portions. A tube sheet 22 is attached to the channel head 18 and has a plurality of holes 24 disposed therein to receive ends of the U-shaped tubes. A dividing plate 26 is centrally disposed within the channel head 18 to divide the channel head into two compartments 28 and 30, which serve as headers for the tube bundle. Compartment 30 is the primary fluid inlet compartment and has a primary fluid inlet nozzle 32 in fluid communication therewith. Compartment 28 is the primary fluid outlet compartment and has a primary fluid outlet nozzle 34 in fluid communication therewith. Thus, primary fluid, i.e., the reactor coolant, which enters fluid compartment 30 is caused to flow through the tube bundle 12 and out through outlet nozzle 34.

The tube bundle 12 is encircled by a wrapper 36, which forms an annular passage 38 between the wrapper 36 and the lower shell 14 and frustoconical transition cone 20. The top of the wrapper 36 is covered by a lower deck plate 40 which includes a plurality of openings 42 in fluid communication with a plurality of riser tubes 44. Swirl vanes 46 are disposed within the riser tubes to cause steam flowing therethrough to spin and centrifugally remove some of the moisture contained within the steam as it flows through this primary centrifugal separator. The water separated from the steam in this primary separator is returned to the water pool 80 (see FIG. 2). After flowing through the primary centrifugal separator, the steam passes though a secondary separator 48 before reaching a steam outlet nozzle 50 centrally disposed in the dished head 16.

The feedwater inlet structure of this generator includes a feedwater inlet nozzle 52 having a generally horizontal portion called a feedring 54 and discharge nozzles 56 elevated above the feedring. Feedwater, which is supplied through the feedwater inlet nozzle 52, passes through the feedring 54, and exits through discharge nozzles 56 and mixes with water which was separated from the steam and is being recirculated. The mixture then flows down over the lower deck plate 40 and into the annular passage 38. The water then enters the tube bundle at the lower portion of the wrapper 36 and flows among and up the tube bundle where it is heated to generate steam.

Figure 2:
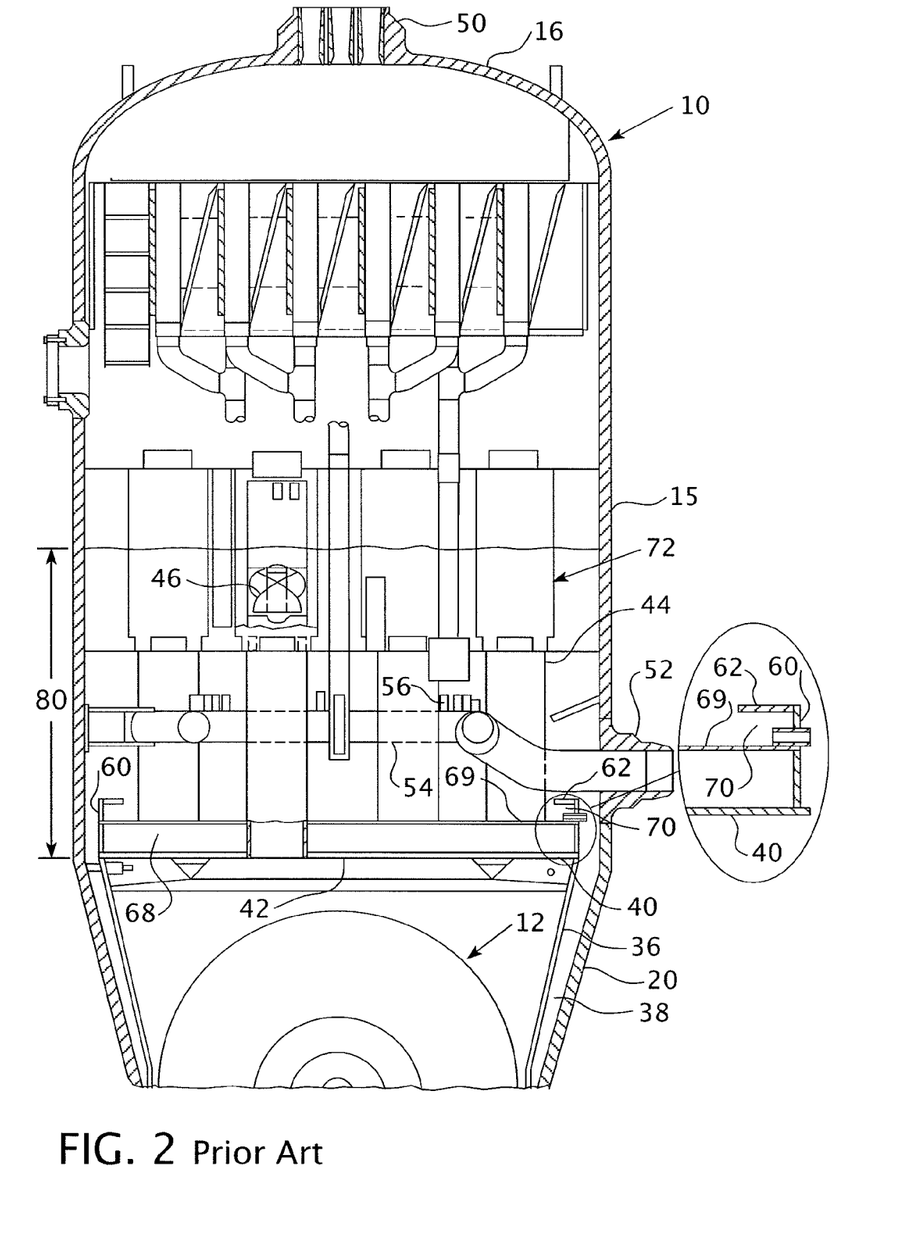
FIG. 2 is a cross-section of the upper portion of the vertical steam generator illustrated in FIG. 1.

FIG. 2 is a cross-sectional view of the upper portion of the steam generator shown in FIG. 1. The same reference characters are employed to designate the corresponding components in the several figures. The generator illustrated in FIGS. 1 and 2 includes the loose parts collector weir 60 described in U.S. patent application Ser. No. 11/563,742 (NSD 2005-013). The loose parts collector weir 60 is a nearly cylindrical wall structure that is interior to the upper drum, i.e., the interior volume above the lower deck plate 40 of the steam generator 10, to retain loose parts along the transit path from the feedwater discharge nozzle 56 to the tube bundle 12. The weir 60 is a vertical, or nearly vertical structure formed as an integral part of or affixed to the lower deck plate 40, such as by welding, at or near the periphery of the lower deck plate 40 and circumscribes the lower deck plate surface, preferably at its near peripheral location. Desirably, the loose parts collector weir 60 includes an inwardly projecting lip which, along with the weir 60 and the lower deck plate 40 to which it is attached form a pocket 70 that captures the loose parts without the possibility of re-entrainment until the parts are removed from the steam generator 10 during a normal outage. As water flows from the top of the lower deck 40 towards the downcomer annulus 38, loose parts will tend to be deposited onto the lower deck plate aided by gravity and be retained by the loose parts collector weir 60.

Figure 3:
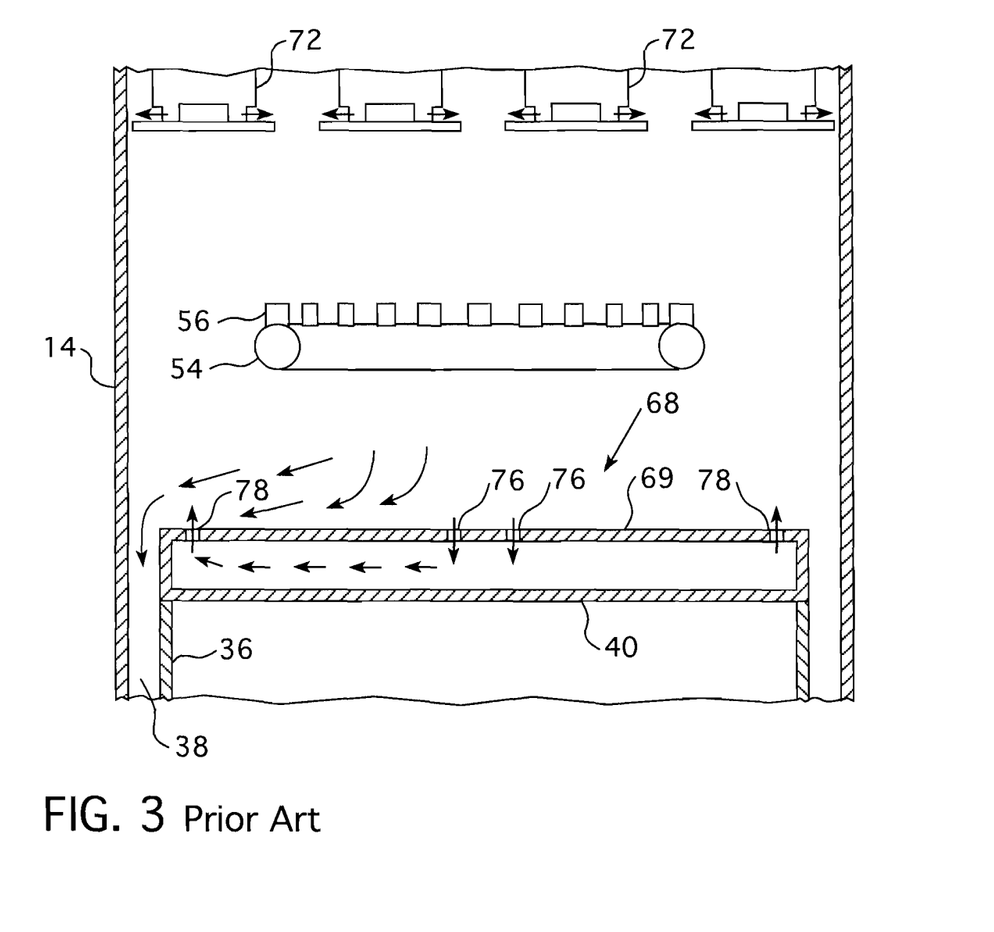
FIG. 3 is a schematic of the lower deck plate portion of a steam generator that illustrates the operation of a conventional sludge collector.

Some operating generators have sludge collectors 68 integrated with the lower deck plate 40. FIG. 3 is a schematic of a portion of the steam generator 10 illustrating the operation of a traditional sludge collector 68. The sludge collector 68 is generally a box that sits on top of the lower deck plate 40. The lower deck plate 40 forms the bottom of the box and a cover 69 (also previously referred to as a lid) is supported above and spaced from the lower deck plate 40. The cover 69 has centrally disposed water inlet holes 76 that receive a portion of the recirculated water from the primary moisture separator 72 and some of the feedwater from the feedwater discharge nozzles 56. The water that enters the feedwater sludge collector box 68 is discharged from peripheral openings 78 around the circumference of the cover 69 where it joins the remainder of the recirculated water and new feedwater and flows over the wrapper 36 into the downcomer passage 38. The sludge collector draws water into the collector box 68 through the inlet holes 76 on the cover 69 of the collector where the water passes through the collector at an extremely slow speed which permits the sludge particles to settle on the floor of the collector while the water continues its passage to the outlet holes 78 in the cover 69 of the collector. The water is drawn into the collector as a result of a pressure differential between the inlet 76 and outlet 78 holes on the cover 69. This pressure differential is developed because the fluid flow near the inlet 76 is relatively quiescent when compared to the flow over the outlet hole 78 where the water is rushing into the downcomer annulus 38 at a relatively high velocity. Therefore, fluid static pressure is relatively high at the inlet holes 76 and low at the outlet holes 78 resulting in a pressure differential between the inlet and outlet that forms the driving force to draw the water into the box of the sludge collector 68.

Figure 4:
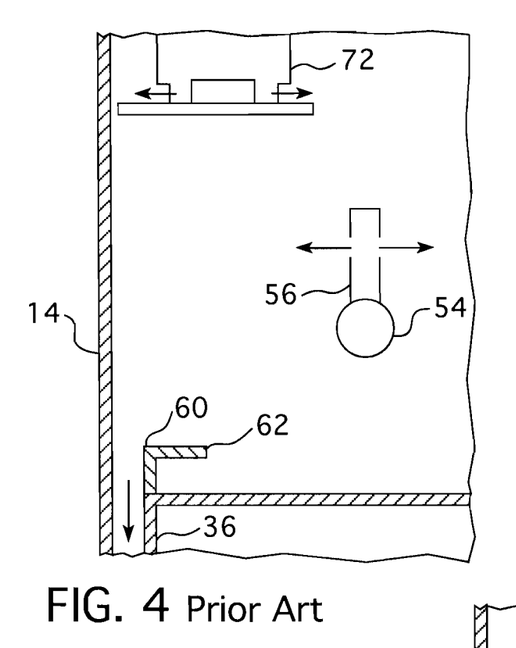
FIG. 4 is a schematic of a portion of the area just above the lower deck plate of a steam generator that illustrates the operation of the loose parts collector of application Ser. No. 11/563,742 (NSD 2005-013)
Figure 5:
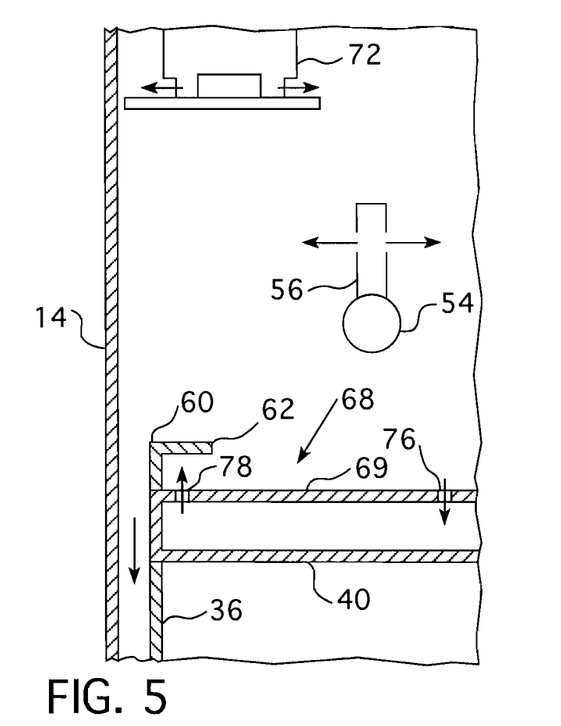
FIG. 5 is a schematic of the area around the lower deck plate portion of a steam generator illustrating the affect of combining the sludge collector of FIG. 3 with the loose parts collector of FIG. 4.

FIG. 4 is a schematic of the portion of the steam generator 10 shown in FIG. 3 showing the loose parts collector 60 previously described. FIG. 5 is a schematic of a portion of a steam generator 10 shown in FIG. 4 combining the loose parts collector 60 shown in FIG. 4 with the traditional sludge collector shown in FIG. 3. FIG. 5 shows the loose parts collector 60 on top of the sludge collector 68. Because of the weir of the loose parts collector, the pressure differential between inlet 76 and outlet holes 78 disappears. Thus, there would be no flow within the sludge collector 68 in the arrangement shown in FIG. 5. In other words, the installation of a loose parts collector in combination with the sludge collector as applied by the prior art, destroys the function of the sludge collector 68.

Figure 6:
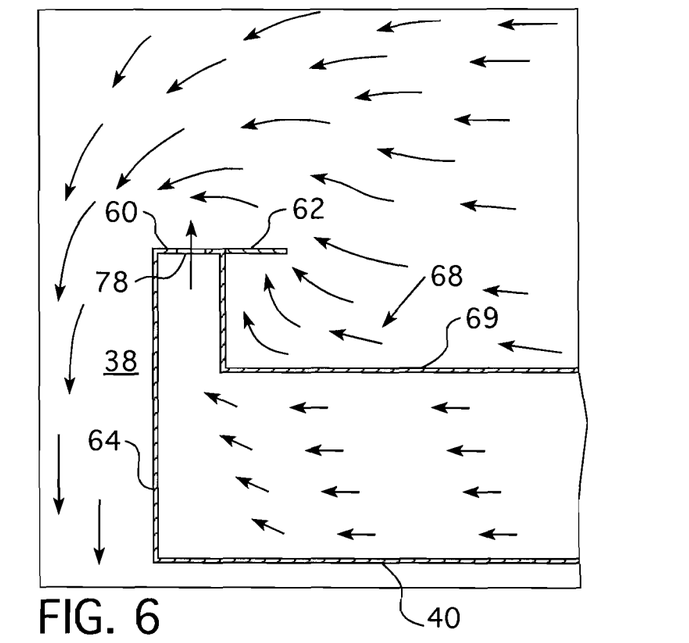
FIG. 6 is a schematic of the area around the lower deck plate portion of a steam generator illustrating the improvement of this invention.

FIG. 6 illustrates a schematic of the portion of the steam generator previously shown in FIGS. 3, 4 and 5 with the improvement provided by this invention that enables sludge to be collected in combination with a loose parts collector as previously described. The key to restoring the pressure differential so that water is drawn into the sludge collector 68 and at the same time enabling the weir 60 to perform its function to stop loose parts from entering the downcomer 38 is to have the water outlet holes 78 of the sludge collector 68 downstream of the weir 60 as illustrated in FIG. 6. The sludge collector 68 of this invention is formed from an outside wall 64 that circumscribes an interior portion and is attached to the upper surface of the deck plate 40 and extends upward to a predetermined height approximately equal to the height of the weir 60 of the prior art. The weir 60 of this invention further comprises a concentric interior wall 58 that is spaced from the outer wall 64 and extends from and is attached to the cover 69 of the sludge collector 68 to approximately the height of the outside wall 64. The weir lip 62 extends from the outside wall 64 radially inward over the inside wall 58, to which it is attached, and is cantilevered inward as in the prior art to prevent loose parts from being drawn over the weir. A sludge water outlet 78 is formed in the lip 62 between the inside wall 58 and the outside wall 64 of the sludge collector 68 so that the sludge outlet water is drawn into the fast moving stream of the water passing over the weir into the downcomer passage 38. The outside wall 64 extends the sludge collector 68 all the way to and through the lip 62 of the weir 60. This extended rectangular box appears as a circular ring in three dimensions. Such an extension reestablishes the pressure differential and enables the water to be drawn into the sludge collector 68 at the water inlet 76 previously shown. Thus, with this improvement sludge particles can settle in the sludge collector 68 as water moves through the collector.

Figure 7:
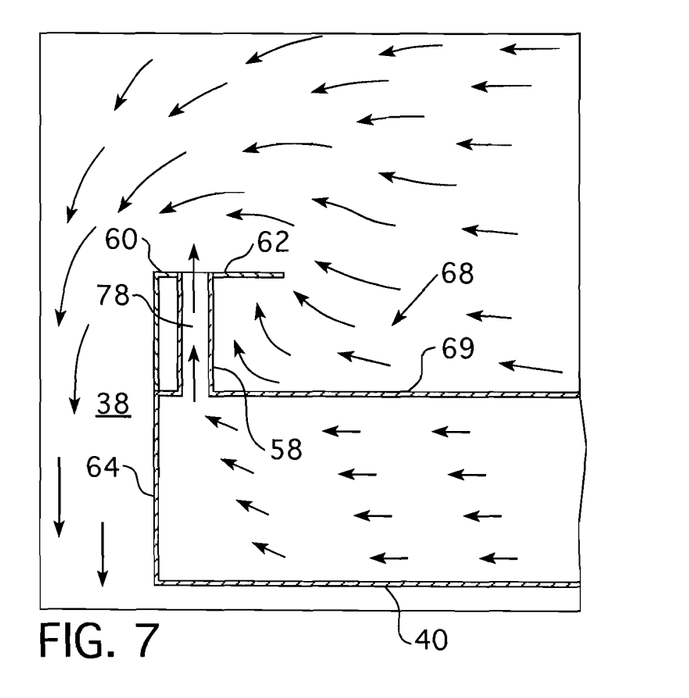
FIG. 7 is a schematic of the area around the lower deck plate portion of a steam generator illustrating a second embodiment of this invention.

FIG. 7 depicts an alternative design for restoring the pressure differential. In this embodiment the coupling of the sludge collector pool with the water passing over the weir is achieved through the use of conduits or tubes that are circumferentially spaced around the cover 69 of the sludge collector 68 and extend vertically through the weir lip 62 of the loose part collector weir 60.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalence thereof.

What is claimed is:

1. A steam generator, comprising:
   a feedwater inlet;
   a tube bundle spaced from the feedwater inlet;
   a wrapper substantially encircling the tube bundle and defining an annulus between the wrapper and an outer shell of the steam generator;
   a loose parts collector disposed between the feedwater inlet and the tube bundle, the loose parts collector having a water overflow edge; and
   a sludge collector having a water outlet disposed downstream of the overflow edge of the loose parts collector and upstream of the annulus with the water outlet at substantially a same elevation as the overflow edge.

2. The steam generator of claim 1 wherein the loose parts collector is a vertical wall that extends in an upward direction away from a lower deck plate of the steam generator and surrounds a feedwater pool fed by the feedwater inlet and the sludge collector water outlet is disposed down stream of an interior side of the vertical wall.

3. The steam generator of claim 1 wherein the loose parts collector is positioned on top of the sludge collector.

4. A steam generator, comprising:
   a feedwater inlet;
   a tube bundle spaced from the feedwater inlet;
   a loose parts collector disposed between the feedwater inlet and the tube bundle, the loose parts collector having a water overflow edge;
   a sludge collector having a water outlet disposed downstream of the overflow edge of the loose parts collector with the loose parts collector positioned on top of the sludge collector; and
   wherein the sludge collector comprises (i) a vertical wall that extends upward from a lower deck plate of the steam generator and surrounds a pool of water fed by the feedwater inlet and (ii) a cover that is supported spaced above the lower deck plate, the cover having a number of access openings disposed inwardly of the vertical wall, the access openings forming an inlet for the feedwater to enter the sludge collector, a peripheral edge of the cover being radially spaced from the vertical wall at least a number of circumferential locations and having a vertically extending ledge that surrounds at least a portion of the cover and terminates in an upward direction to form the over flow edge, at least portions of the vertically extending ledge being spaced from an interior side of the vertical wall to form a conduit there between that forms the water outlet of the sludge collector.

5. The steam generator of claim 4 wherein the overflow edge has a radially, inwardly extending ledge that forms a weir.

6. The steam generator of claim 4 wherein the vertical wall circumscribes the lower deck plate and the vertically extending ledge circumscribes the cover, spaced from the vertical wall.

7. The steam generator of claim 6 wherein the vertical wall and the vertically extending ledge define an annular passage that forms the sludge collector water outlet.

8. The steam generator of claim 4 wherein the vertical wall and the vertically extending ledge are formed as one member with the sludge collector water outlet extending there through.

9. The steam generator of claim 4 wherein the access openings are centrally disposed.

10. A nuclear reactor power generation facility having a steam generator comprising:
    a feedwater inlet;
    a tube bundle spaced from the feedwater inlet;
    a wrapper substantially encircling the tube bundle and defining an annulus between the wrapper and an outer shell of the steam generator;
    a loose parts collector disposed between the feedwater inlet and the tube bundle, the loose parts collector having a water overflow edge; and
    a sludge collector having a water outlet disposed downstream of the overflow edge of the loose parts collector and upstream of the annulus with the water outlet at substantially a same elevation as the overflow edge.

11. The nuclear reactor power generation facility of claim 10 wherein the loose parts collector is a vertical wall that extends in an upward direction away from a lower deck plate of the steam generator and surrounds a feedwater pool fed by the feedwater inlet and the sludge collector water outlet is disposed down stream of an interior side of the vertical wall.

12. The nuclear reactor power generation facility of claim 10 wherein the loose parts collector is positioned on top of the sludge collector.

13. A nuclear reactor power generation facility having a steam generator comprising:
    a feedwater inlet;
    a tube bundle spaced from the feedwater inlet;
    a loose parts collector disposed between the feedwater inlet and the tube bundle, the loose parts collector having a water overflow edge;
    a sludge collector having a water outlet disposed downstream of the overflow edge of the loose parts collector with the loose parts collector positioned on top of the sludge collector; and
    wherein the sludge collector comprises (i) a vertical wall that extends upward from a lower deck plate of the steam generator and surrounds a pool of water fed by the feedwater inlet and (ii) a cover that is supported spaced above the lower deck plate, the cover having a number of access openings disposed inwardly of the vertical wall, the access openings forming an inlet for the feedwater to enter the sludge collector, a peripheral edge of the cover being radially spaced from the vertical wall at a number of circumferential locations and having a vertically extending ledge that surrounds at least a portion of the cover and terminates in an upward direction to form the overflow edge, at least portions of the vertically extending ledge being spaced from an interior side of the vertical wall to form a conduit there between that forms the water outlet of the sludge collector.

14. The nuclear reactor power generation facility of claim 13 wherein the vertical wall circumscribes the lower deck plate and the vertically extending ledge circumscribes the cover and is spaced from the vertical wall to define an annular passage that forms the sludge collector water outlet.

15. The nuclear reactor power generation facility of claim 13 wherein the vertical wall and the vertically extending ledge are formed as one member with the sludge collector outlet extending there through.

16. The nuclear reactor power generation facility of claim 13 wherein the access openings are centrally disposed.

* * * * *